US011429734B2

(12) United States Patent
Shivakumar et al.

(10) Patent No.: US 11,429,734 B2
(45) Date of Patent: Aug. 30, 2022

(54) PROTECTION OF SENSITIVE DATA FIELDS IN WEBPAGES

(71) Applicant: Microsoft Technology Licensing, LLC, Redmond, WA (US)

(72) Inventors: Swaroop Mallapura Shivakumar, Redmond, WA (US); Venkata Somanadha Sarma Remany, Samamish, WA (US); Ishtiyaq Ahmad Sheikh, Redmond, WA (US); Malcolm Erik Pearson, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 262 days.

(21) Appl. No.: 16/518,774

(22) Filed: Jul. 22, 2019

(65) Prior Publication Data

US 2021/0026977 A1   Jan. 28, 2021

(51) Int. Cl.
*G06F 17/00* (2019.01)
*G06F 21/62* (2013.01)
*G06F 16/958* (2019.01)
*G06F 40/14* (2020.01)

(52) U.S. Cl.
CPC ........ *G06F 21/6218* (2013.01); *G06F 16/958* (2019.01); *G06F 40/14* (2020.01)

(58) Field of Classification Search
CPC ..... H04L 67/34; G06F 21/6218; G06F 40/14; G06F 16/958
USPC .................... 726/27; 715/234, 240
See application file for complete search history.

(56) References Cited

U.S. PATENT DOCUMENTS

| 8,789,178 B2* | 7/2014 | Kejriwal ................. H04L 63/14 726/22 |
| 8,838,767 B2 | 9/2014 | Lakes et al. |
| 8,839,424 B2 | 9/2014 | Hansen |
| 8,856,869 B1* | 10/2014 | Brinskelle ........... G06F 21/6218 726/2 |
| 9,251,372 B1* | 2/2016 | Lahoz ..................... H04L 63/04 |
| 9,262,782 B2 | 2/2016 | Coleman et al. |

(Continued)

OTHER PUBLICATIONS

Mahmoud, A Comparative Analysis of Cross Site Scripting (XSS) Detecting and Defensive Techniques, 2017, The 8th IEEE International Conference on Intelligent Computing and Information Systems (ICICIS) (Year: 2017).*

(Continued)

*Primary Examiner* — Stephen S Hong
*Assistant Examiner* — Matthew J Ludwig
(74) *Attorney, Agent, or Firm* — Mannava & Kang, P.C.

(57) ABSTRACT

According to examples, an apparatus may include a processor and a computer readable medium on which is stored machine readable instructions that may cause the processor to receive a request for a webpage from a web browser. The processor may send webpage code of the webpage to the web browser and the webpage may load a secure webpage for a sensitive data field that is separate from the webpage. A secure server may provide the secure webpage, which may correspond to an identifier that points to the secure server. By receiving the sensitive data into the sensitive data field of the secure webpage, the sensitive data may be protected from a script loaded in the webpage. In addition, the processor may receive the sensitive data from the secure server.

18 Claims, 5 Drawing Sheets

(56) References Cited

U.S. PATENT DOCUMENTS

| | | | | |
|---|---|---|---|---|
| 9,715,681 B2* | 7/2017 | Hammad | ............... | G06Q 20/12 |
| 9,792,611 B2* | 10/2017 | Hammad | ............... | H04L 9/321 |
| 9,848,052 B2* | 12/2017 | Kumnick | ............... | H04L 67/20 |
| 10,644,843 B2* | 5/2020 | Cheng | ............... | H04L 1/1893 |
| 10,726,424 B1* | 7/2020 | Yee | ............... | H04L 67/02 |
| 11,113,126 B2* | 9/2021 | Gallagher | ............... | G06F 40/14 |
| 2010/0094755 A1 | 4/2010 | Kloster | | |
| 2010/0306854 A1* | 12/2010 | Neergaard | ............ | G06F 21/6254 |
| | | | | 726/26 |
| 2011/0307710 A1* | 12/2011 | McGuire | ............ | G06Q 20/385 |
| | | | | 726/9 |
| 2012/0030557 A1* | 2/2012 | Wiblin | ................ | G06F 40/174 |
| | | | | 715/226 |
| 2013/0093474 A1* | 4/2013 | Yang | ............ | H03K 17/302 |
| | | | | 327/109 |
| 2013/0198851 A1* | 8/2013 | Spies | ............ | G06Q 99/00 |
| | | | | 726/26 |
| 2013/0263226 A1* | 10/2013 | Sudia | ............ | G06F 21/60 |
| | | | | 726/4 |
| 2014/0114843 A1 | 4/2014 | Klein et al. | | |
| 2014/0157370 A1* | 6/2014 | Plattner | ............... | G06F 21/6245 |
| | | | | 726/4 |
| 2014/0244623 A1* | 8/2014 | King | ............ | G06F 16/26 |
| | | | | 707/756 |
| 2016/0119289 A1* | 4/2016 | Jain | ............ | H04L 63/0471 |
| | | | | 726/12 |
| 2016/0342997 A1* | 11/2016 | De Tella | ............ | G06Q 20/40975 |
| 2017/0053139 A1 | 2/2017 | Schenk et al. | | |
| 2017/0068939 A1 | 3/2017 | Groarke et al. | | |
| 2017/0346830 A1* | 11/2017 | Goldfarb | ............... | H04L 63/102 |
| 2018/0049023 A1* | 2/2018 | Stuber | ............ | G06F 9/452 |
| 2018/0285876 A1 | 10/2018 | Vrtic et al. | | |
| 2019/0102778 A1 | 4/2019 | Lebovic | | |
| 2020/0304481 A1* | 9/2020 | Rathore | ............... | G06F 21/6218 |
| 2020/0304516 A1* | 9/2020 | Lazar | ............ | H04L 63/20 |
| 2020/0372172 A1* | 11/2020 | Murray | ............... | G06F 21/6245 |
| 2020/0382545 A1* | 12/2020 | Cropp | ............... | G06F 21/6263 |

OTHER PUBLICATIONS

Rich, Understanding and selecting a tokenization solution: Introduction, Securosis.com, 2010 (Year: 2010).*

"How to Protect Your Data from Magecart and Other E-commerce Attacks", Malwarebytes Labs, Sep. 28, 2018, 5 Pages. Retrieved from: https://blog.malwarebytes.com/cybercrime/2018/09/how-to-protect-your-data-from-magecart-and-other-e-commerce-attacks/.

"Skimming Prevention: Best Practices for Merchants", PCI Security Standards Council, Sep. 2014, 36 Pages. Retrieved from https://www.pcisecuritystandards.org/documents/Skimming%20Prevention%20BP%20for%20Merchants%20Sept2014.pdf.

"Third Party Analytics/Tracking Javascript Tags and PCI DSS", Information Security Stack Exchange, Apr. 16, 2016, 3 Pages. Retrieved from: https://web.archive.org/web/20160416124211/https:/security.stackexchange.com/questions/103809/third-party-analytics-tracking-javascript-tags-and-pci-dss.

"Non-Provisional Application Filed in U.S. Appl. No. 15/934,719", filed Mar. 23, 2018, 46 Pages.

"International Search Report and Written Opinion Issued in PCT Application No. PCT/US20/035796", dated Sep. 4, 2020, 13 Pages.

* cited by examiner

PROTECTION OF SENSITIVE DATA FIELDS IN WEBPAGES

BACKGROUND

Businesses and government offices enable ever increasing numbers of services online and websites continue to get more sophisticated to improve user experiences with the websites. As a result, the flow of sensitive data through websites continues to increase. For instance, users typically enter sensitive data on websites when shopping, paying bills, filing taxes, trading stocks, or the like. The sensitive data may include social security numbers, credit card numbers, card verification values (CVVs), birth dates, etc. Due to the sensitive nature of this type of data, enhanced security measurements may often be used to protect the sensitive data from being manipulated or stolen.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
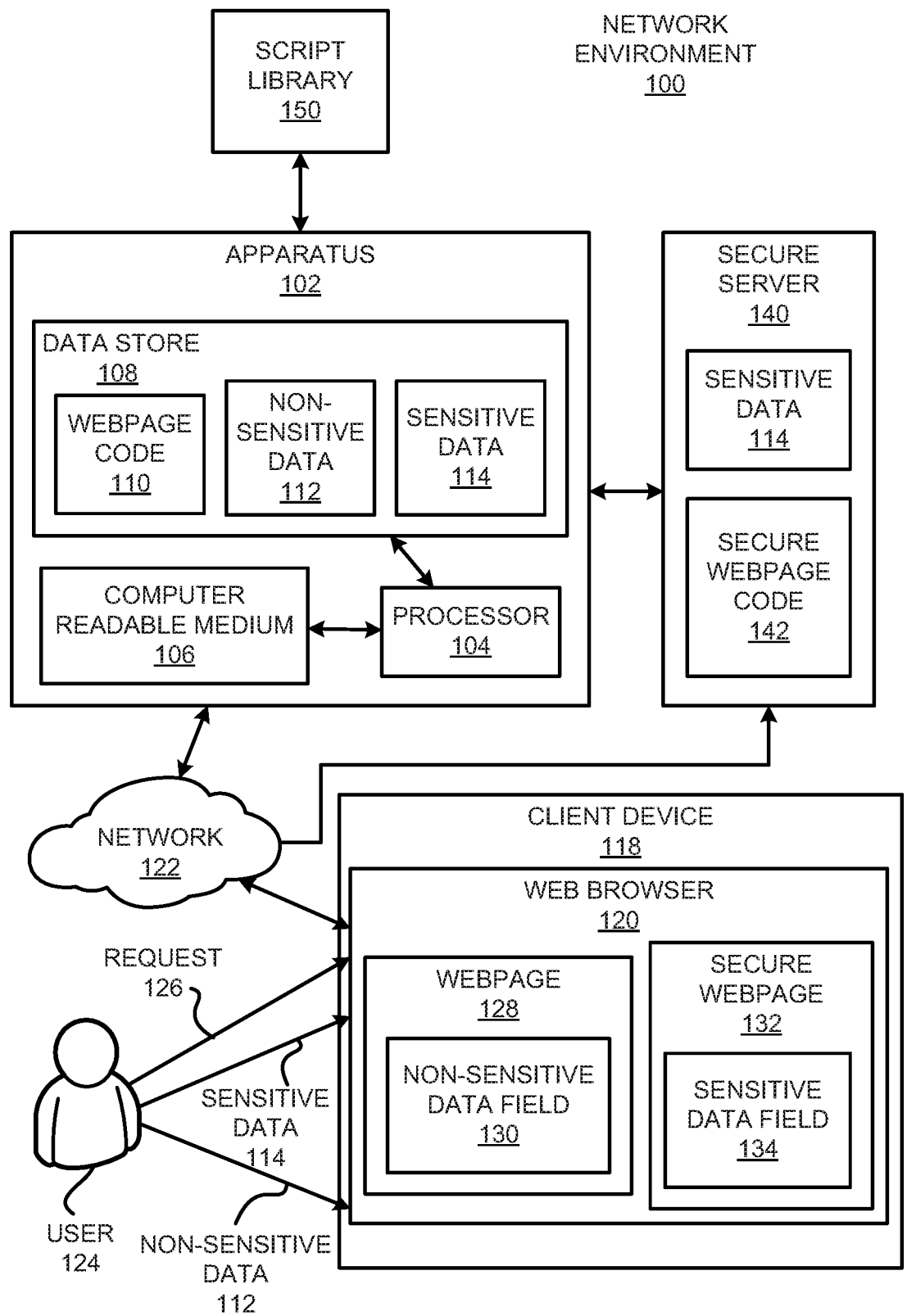
FIG. 1 depicts a block diagram of a network environment that may include an apparatus that may access sensitive data from a secure webpage displayed in a web browser of a client device in a secure manner in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Generally speaking, various script libraries may be used in webpages to improve user experiences with the webpages. For example, an e-commerce website may use script libraries for user analytics, telemetry, animation, and/or the like. In many instances, the script libraries running in a webpage may access user interface (UI) elements running in the webpage such as text boxes, checkboxes, etc., because of, for instance, a same-origin policy of web browsers. That is, if a webpage from an origin has access to a browser resource, all of the other webpages and scripts from that origin may also have access to those browser resources. An origin may be defined as a combination of the universal resource identifier (URI) schema, e.g., https, host name, and port number. Thus, a script library running in the context of a webpage may be allowed to access the document object model (DOM) elements, e.g., in-memory representation of UI elements and their data. As a result, script libraries may access data entered into the UI elements such as by skimming the data, which may result in problems such as data breaches, especially when the data is sensitive data. This problem may be exacerbated by the increasing sophistication of functionalities in the websites and thus the greater usage of the script libraries.

Disclosed herein are apparatuses, methods, and computer readable media that may protect a sensitive data field in a webpage from a remainder of the webpage. For instance, the sensitive data field may be in a secure webpage provided by a secure server, in which the secure webpage may be embedded in the webpage. The secure webpage and thus, the sensitive data field, may correspond to an identifier that points to the secure server such that data entered into the sensitive data field may be sent to the secure server. The secure webpage may have a different origin, e.g., the secure server, than the webpage and thus, the same-origin policy of web browsers may not result in scripts running in the webpage having access to the UI elements of the secure webpage, i.e., the sensitive data field. As a result, any scripts running in the webpage may not access the data entered into the sensitive data field.

Instead, the sensitive data entered into the sensitive data field may be sent to the secure server. The secure server may send the sensitive data to the origin of the webpage, for instance, after performing a verification process that the origin is authorized to receive the sensitive data. In one regard, the sensitive data may be communicated from the sensitive data field to a processor of the origin, e.g., the apparatus discussed herein, while bypassing the webpage and thus any script libraries running in the webpage. As such, the script libraries running in the webpage may be prevented from accessing the sensitive data. As the script libraries may be third party script libraries, a third party may be prevented from accessing the sensitive data.

A technical issue associated with providing webpages with high levels of functionality through use of script libraries may be that data entered into a webpage loaded on a web browser may be susceptible to access by the script libraries running in the webpages. In instances in which a malicious entity may have added malicious code to a script library through a security vulnerability in the vendor the script library, the malicious code may access the data and may send the data to the malicious entity, which may result in a data breach and may compromise security of the data entered into the webpages. When a data breach occurs, enormous amounts of computing and energy resources may be utilized to identify and contain the data breach.

Through implementation of the apparatuses, methods, and computer readable media disclosed herein, sensitive data entered into a sensitive data field may be protected from a script library running in the webpage. That is, the sensitive data field may be separate from the webpage and may have a different origin than the webpage and thus, a web browser may not afford the script library running in the webpage access to the data entered into the sensitive data field. In addition, a secure server may receive the sensitive data and may securely communicate the sensitive data to the host of the webpage, which may prevent the script library running in the webpage from accessing the sensitive data. As a result, a breach of the sensitive data may be prevented and/or rendered more difficult, which may reduce or avoid utilization of computing and energy resources to identify and contain a data breach. This may result in reduced computing and energy resource consumption by computing devices, servers, networking equipment, etc., in securely providing webpages to client computers. In the case of a data breach due to, for instance, a skimming attack, there may also be costs/damages which may be in the form of reparation to be paid out to customers, loss of reputation and trust among current and prospective customers, regulatory fines/penalties.

Reference is first made to FIG. 1, which shows a block diagram of a network environment 100 that may include an apparatus 102, in which the apparatus 102 may access sensitive data from a secure webpage 132 displayed in a web browser 120 of a client device 118 in a secure manner in accordance with an embodiment of the present disclosure. It should be understood that the network environment 100 and the apparatus 102 depicted in FIG. 1 may include additional features and that some of the features described herein may be removed and/or modified without departing from the scope of the network environment 100 and/or the apparatus 102.

The apparatus 102 may be a server, a node in a network (such as a data center), and/or the like, and may host a website from which client devices may retrieve a webpage via a particular universal resource locator (URL). The apparatus 102 may include a processor 104, a computer readable medium 106, and a data store 108, which are described in further detail herein with respect to FIG. 2. As shown, the data store 108 may store a webpage code 110, non-sensitive data 112, and sensitive data 114. According to examples, in response to receipt of a request to access the URL from a web browser 120 (e.g., requester), the apparatus 102 may send the webpage code 110 to the web browser 120.

The web browser 120 may be a program that may execute on a client device 118 and may communicate with the apparatus 102 via a network 122. The web browser 120 may be an Internet browser and the network 122 may be the Internet, for example. In any regard, a user 124 may input a request 126 to navigate to a webpage 128 into the web browser 120 such as by inputting the URL of the webpage 128 into a navigation bar of the web browser 120. In response to receipt of the request 126, the apparatus 102 may send the webpage code 110 to the web browser 120. The web browser 120 may execute the webpage code 110 to load, e.g., display, the webpage 128 on the web browser 120.

The webpage 128 may load a script for a non-sensitive data field 130 into which the user 124 may input non-sensitive data 112 to be displayed. Additionally, the webpage 128 may load secure webpage code 142 to render a secure webpage 132 including a sensitive data field 134 into which the user 124 may input sensitive data 114 to be displayed. The non-sensitive data 112 may include, for instance, publicly available and/or otherwise non-confidential information such as a user's name, a name on a credit card, a month and a year of expiration of a credit card, and/or the like. The sensitive data 114 may include, for instance, non-publicly available, personal, and/or confidential information such as a credit card number, a social security number, a date of birth, a credit card verification value, a driver's license number, and/or the like.

As discussed herein, the secure webpage 132 and thus, the sensitive data field 134 may be separate from the webpage 128. That is, script libraries (equivalently referenced herein as scripts) loaded in the webpage 128 may not access the sensitive data field 134 and thus may not access the sensitive data 114 inputted into the sensitive data field 134. Instead, the webpage 128 may load a script that may initiate a request to a secure server 140 to provide the secure webpage code 142 for the secure webpage 132 such that data entered into the sensitive data field 134 may be delivered to the secure server 140 and not to the scripts loaded in the webpage 128. For instance, the secure server 140 may provide the secure webpage 132 for the sensitive data field 134 that may correspond to an identifier, e.g., a URL, of the secure server 140. In some examples, the secure webpage 132 including the sensitive data field 134 may be an inline frame (iFrame) of the webpage 128. That is, the webpage 128 may be an HTML document and the secure webpage 132 may be an HTML document (field) embedded within the webpage 128 HTML document, in which the secure server 140 provides the secure webpage 132.

As discussed herein, the secure server 140, and not the apparatus 102, may receive sensitive data 114 entered into the sensitive data field 134. Instead, the secure server 140 may send the sensitive data 114 to the apparatus 102 via the secure webpage 132. In this regard, the apparatus 102 may receive the sensitive data 114 in a secure manner, e.g., without scripts of the webpage 128 accessing the sensitive data 114.

The secure server 140 may be a server that may host a secure website. In some examples, the secure server 140 may use no script libraries, e.g., JavaScript libraries, for code for the secure webpage for the sensitive data field 134. In some examples, the secure server 140 may use a few, trusted script libraries for the secure webpage for the sensitive data field 134. In these examples, as the secure server 140 may use a limited number of script libraries, the secure server 140 may limit the scripts for the secure webpage 132 to script libraries that have undergone a thorough review process.

However, the webpage 128 may download a script from a script library 150. In some examples, the script library 150 may be a third party script library, which may be a library that is outside of the control of the apparatus 102. That is, the script library 150 may supply a script that has been generated and maintained by a third party, e.g., a party other than a party that may operate and/or administer the apparatus 102. The script from the script library 150, which may also be referenced herein as a script, may be a script that may perform any of a number of functions in the webpage 128. For instance, the script may add an appearance feature, functionality, user interface (UI) animation, data analytics, and/or the like to the webpage 128. By way of particular example, the script may cause the webpage 128 to have a certain appearance, for instance, to enhance a user experience with the webpage 128.

In some examples, the webpage 128 may load the script to save time and engineering resources because generating the webpage 128 to have the intended functions may consume a great deal of time and engineering resources. As such, for instance, the webpage code 110 may be generated in a relatively more efficient manner through use of the script from the script library 150. However, execution of the script on the webpage 128 may make the webpage 128 vulnerable to an attack, such as via skimming of information inputted into the webpage 128. That is, the script may include malicious instructions that may capture the inputted information and may communicate the inputted information to a location outside of the apparatus 102. In this manner, execution of the script in the webpage 128 may enable the script to access the inputted information, which may be used for malicious purposes.

As discussed herein, a script may be used in the webpage 128 to provide the webpage 128 with various intended functionalities. The functionalities may be directed to the appearance of the webpage 128, data analytics associated with the webpage 128, and/or the like. Additionally, by causing the sensitive data 114 to be sent to the secure server 140 instead of through the webpage 128 as discussed herein, the sensitive data 114 may be protected from a script that may have been loaded in the webpage 128.

Figure 2:
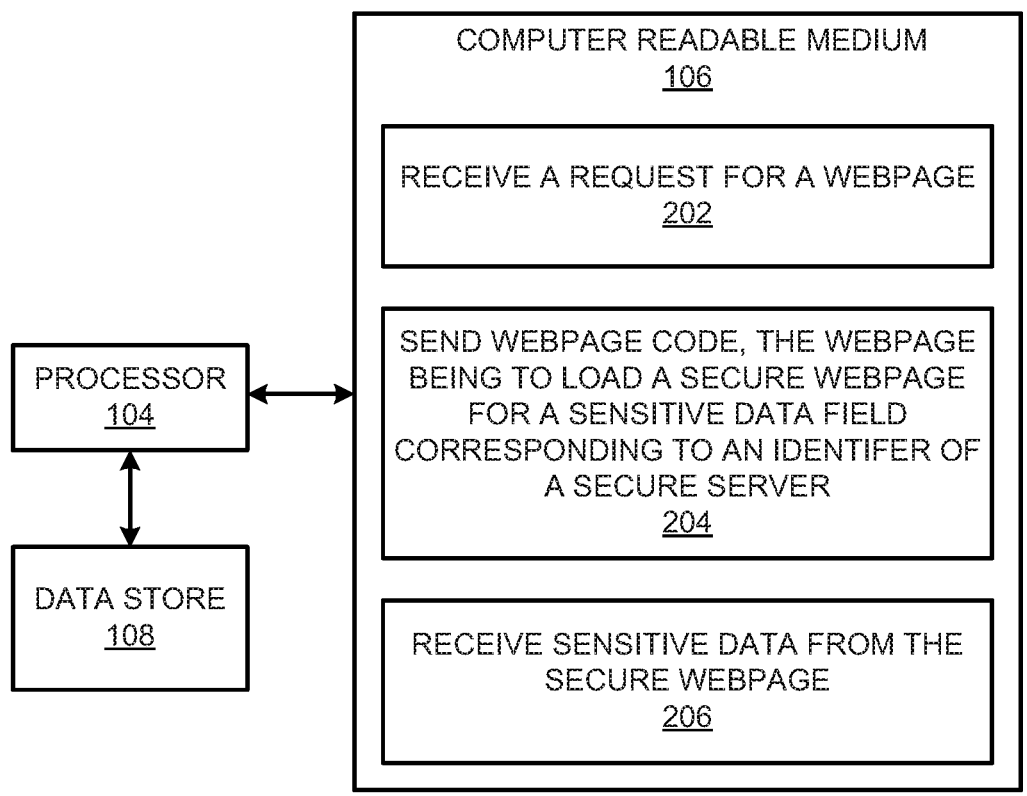
FIG. 2 shows a block diagram of the apparatus depicted in FIG. 1 in accordance with an embodiment of the present disclosure.

Turning now to FIG. 2, there is shown a block diagram of the apparatus 102 depicted in FIG. 1 in accordance with an embodiment of the present disclosure. It should be understood that the apparatus 102 depicted in FIG. 2 may include additional features and that some of the features described herein may be removed and/or modified without departing from the scope of the apparatus 102. The description of the apparatus 102 is made with reference to FIG. 1 for purposes of illustration.

As shown in FIG. 2, the apparatus 102 may include the processor 104, the computer readable medium 106, and the data store 108. The processor 104 may be a semiconductor-based microprocessor, a central processing unit (CPU), an application specific integrated circuit (ASIC), a field-programmable gate array (FPGA), and/or other hardware device. Although the apparatus 102 is depicted as having a single processor 104, it should be understood that the apparatus 102 may include additional processors and/or cores without departing from a scope of the apparatus 102. In this regard, references to a single processor 104 as well as to a single machine readable medium 106 may be understood to additionally or alternatively pertain to multiple processors 104 and multiple computer readable mediums 106.

The computer readable medium 106 and/or the data store 108 may each be, for example, a Random Access memory (RAM), an Electrically Erasable Programmable Read-Only Memory (EEPROM), a storage device, an optical disc, or the like. The computer readable medium 106, which may also be referred to as a machine readable storage medium, may be a non-transitory computer readable storage medium, where the term "non-transitory" does not encompass transitory propagating signals. In any regard, the computer readable medium 106 may have stored thereon machine readable instructions 202-206.

The processor 104 may fetch, decode, and execute the instructions 202 to receive a request for a webpage 128. For instance, a user 124 may navigate to the URL of the requested webpage 128 in a web browser 120 of a client device 118 and the web browser 120 may send the request to the apparatus 102 via a network 122.

The processor 104 may fetch, decode, and execute the instructions 204 to send webpage code 110 of the webpage 128 to the web browser 120. The web browser 120 may execute the webpage code 110 to load the webpage 128. The webpage 128 may also load a script for a secure webpage 132 including a sensitive data field 134 that is separate from the webpage 128. The script for the secure webpage 132 may cause an https GET request to the secure server 140 to be initiated and the secure server 140 may return a secure webpage code 142 for the secure webpage 132. That is, the secure webpage 132 of the secure server 140 may be iFramed within the webpage 128. The iFrame may include an identifier, e.g., a URL, that points to a secure server 140. As discussed herein, the webpage 128 and the scripts loaded in the webpage 128 may not access the sensitive data 114 inputted into the sensitive data field 134 as the sensitive data 114 may be sent to the secure server 140 and may not be sent to the apparatus 102 via the webpage 128. In this regard, sensitive data 114 inputted into the sensitive data field 134 may be protected from the scripts loaded in the webpage 128.

As discussed herein, the webpage 128 may load a script that may add functionality, UI animation, data analytics, and/or the like to the webpage 128. Additionally, by preventing access by the webpage 128 to the sensitive data 114, the script may also be prevented from accessing the sensitive data 114.

The processor 104 may fetch, decode, and execute the instructions 206 to receive the sensitive data 114 from the secure server 140. As discussed herein, the webpage 128 may not have access to the data entered into the sensitive data field 134. As such, the webpage 128 may not identify the sensitive data 114 entered into the sensitive data field 134. Instead, the processor 104 may receive the sensitive data 114 from the secure server 140, which may prevent the webpage 128, and any script loaded in the webpage 128 from identifying the sensitive data 114. The processor 104 may obtain the sensitive data 114 from the secure server 140 in a secure manner as discussed herein.

According to examples, the webpage 128 may also load a script for a non-sensitive data field 130 to be displayed in the webpage 128. In these examples, the webpage 128 may access the non-sensitive data 112 entered into the non-sensitive data field 130. As such, the processor 104 may collect the non-sensitive data 112 from the non-sensitive data field 130 in the webpage 128 and may store the non-sensitive data 112 in the data store 108. A script loaded in the webpage 128 may thus have access to the non-sensitive data 112 entered into the non-sensitive data field 130.

Instead of the machine readable instructions 202-206, the apparatus 102 may include hardware logic blocks that may perform functions similar to the instructions 202-206. In other examples, the apparatus 102 may include a combination of instructions and hardware logic blocks to implement or execute functions corresponding to the instructions 202-206. In any of these examples, the processor 104 may implement the hardware logic blocks and/or execute the instructions 202-206. As discussed herein, the apparatus 102 may also include additional instructions and/or hardware logic blocks such that the processor 104 may execute operations in addition to or in place of those discussed above with respect to FIG. 2.

Figure 3:
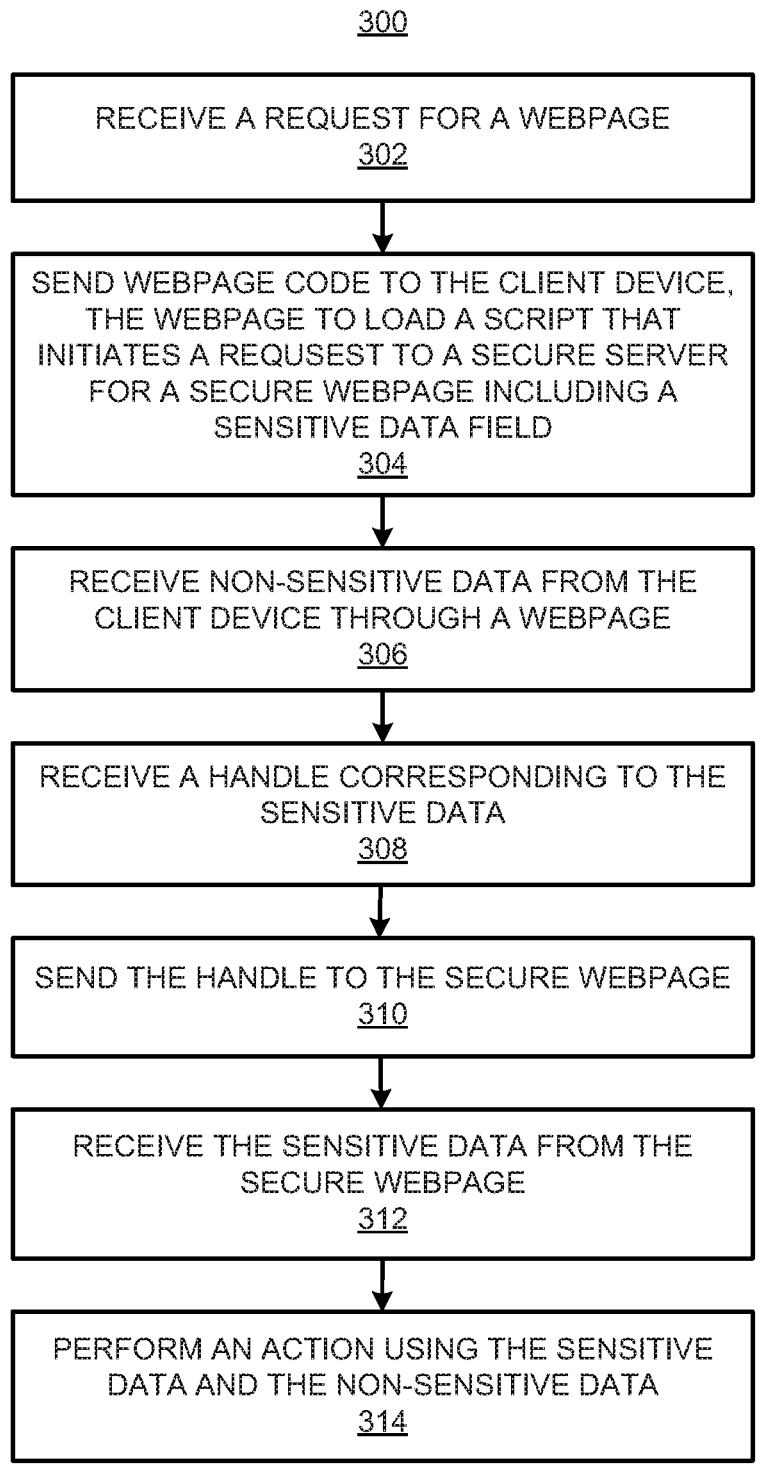
FIG. 3 depicts a flow diagram of a method for accessing sensitive data entered into a secure webpage in a secure manner in accordance with an embodiment of the present disclosure.

Various manners in which the processor 104 of the apparatus 102 may operate are discussed in greater detail with respect to the method 300 depicted in FIG. 3. Particularly, FIG. 3 depicts a flow diagram of a method 300 for accessing sensitive data entered into a secure webpage in a secure manner in accordance with an embodiment of the present disclosure. It should be understood that the method 300 depicted in FIG. 3 may include additional operations and that some of the operations described therein may be removed and/or modified without departing from the scope of the method 300. The description of the method 300 is made with reference to the features depicted in FIGS. 1-2 for purposes of illustration.

At block 302, the processor 104 may receive a request 126 for a webpage 128. The processor 104 may receive the request from a web browser 120 of a client device 118 via a network 122. That is, a user may navigate to the URL of the webpage 128 on the web browser 120. The web browser 120 may initiate a https GET request to the URL of the webpage 128. Based on receipt of the https GET request, at block 304, the processor 104 may send webpage code 110 of the webpage 128 to the client device 118, e.g., the web browser 120 executing on the client device 118. The web browser 120 may load the webpage code 110 to cause the webpage 128 to be displayed on the client device 118.

On loading the webpage 128, the webpage 128 may download scripts referenced by the webpage 128 in a script block. The scripts may include script libraries hosted on the webpage 128 as well as on other servers. The script libraries may include scripts developed by a developer of the webpage 128 as well as or alternatively by an external party. In addition, once loaded, the scripts may be considered to be of the same origin and may access UI elements of the webpage 128. In this regard, the scripts may access data entered into the non-sensitive data field 130 of the webpage 128.

Once loaded, the scripts in the webpage 128 may initiate a GET request to the secure sever 140 and the secure server 140 may return secure webpage code 142 for a secure webpage 132 that may be iFramed within the webpage 128. The secure webpage 132 may not load any script libraries or may load a trusted script library. As discussed herein, the code or libraries loaded by the webpage 128 may not access the sensitive data field 134 included in the secure webpage 132 and thus may not access the sensitive data 114 entered into the sensitive data field 134.

The secure webpage 132 may correspond to an identifier, e.g., a URL, that points to a secure server 140, in which the secure server 140 is to receive sensitive data 114 entered into the sensitive data field 134 to protect the sensitive data from the code included in the webpage code 110. The web browser 120 may send the sensitive data 114 entered into the sensitive data field 134 to the secure server 140 based on a determination that the data in the sensitive data field 134 is to be sent, e.g., when a user 124 presses an "enter" button, after some predefined period of time, and/or the like.

At block 306, the processor 104 may receive non-sensitive data 112 from the client device 118. For instance, a user 124 may enter non-sensitive data 112 into the non-sensitive data field 130 of the webpage 128 and based on a determination that the processor 104 is to capture the data in the non-sensitive data field 130, e.g., when a user presses an "enter" button, after some predefined period of time, and/or the like, the web browser 120 may send the data 112 in the non-sensitive data field 130 to the apparatus 102.

At block 308, the processor 104 may receive a handle corresponding to the sensitive data 114. In some examples, the webpage 128 may receive the handle corresponding to the sensitive data 114 from the secure webpage 132. In any regard, the handle may be a token, a session identifier, or the like, corresponding to or otherwise assigned to the sensitive data 114. Thus, instead of automatically sending the sensitive data 114 to the processor 104, the secure webpage 132 may send the handle corresponding to the sensitive data 114 to the webpage 128. The secure webpage 132 may also send an operational status of the sensitive data 114 to the webpage 128, which may send that information to the processor 104, e.g., whether collection of the sensitive data 114 was successful or has failed.

At block 310, the processor 104 may send the handle to the secure server 140. Particularly, for instance, based on the operational status of the sensitive data 114 being successful, the processor 104 may post fields on its UI to the webpage 128 along with the handle. In addition, at block 312, the processor 104 may receive the sensitive data 114 from the secure server 140. At block 314, the processor 104 may perform an action using the sensitive data and the non-sensitive data. By way of example in which the webpage 128 collects information for the purchase of an item, the processor 104 may process credit card information included in the non-sensitive data 112 and the sensitive data 114 to either approve or deny the sale.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
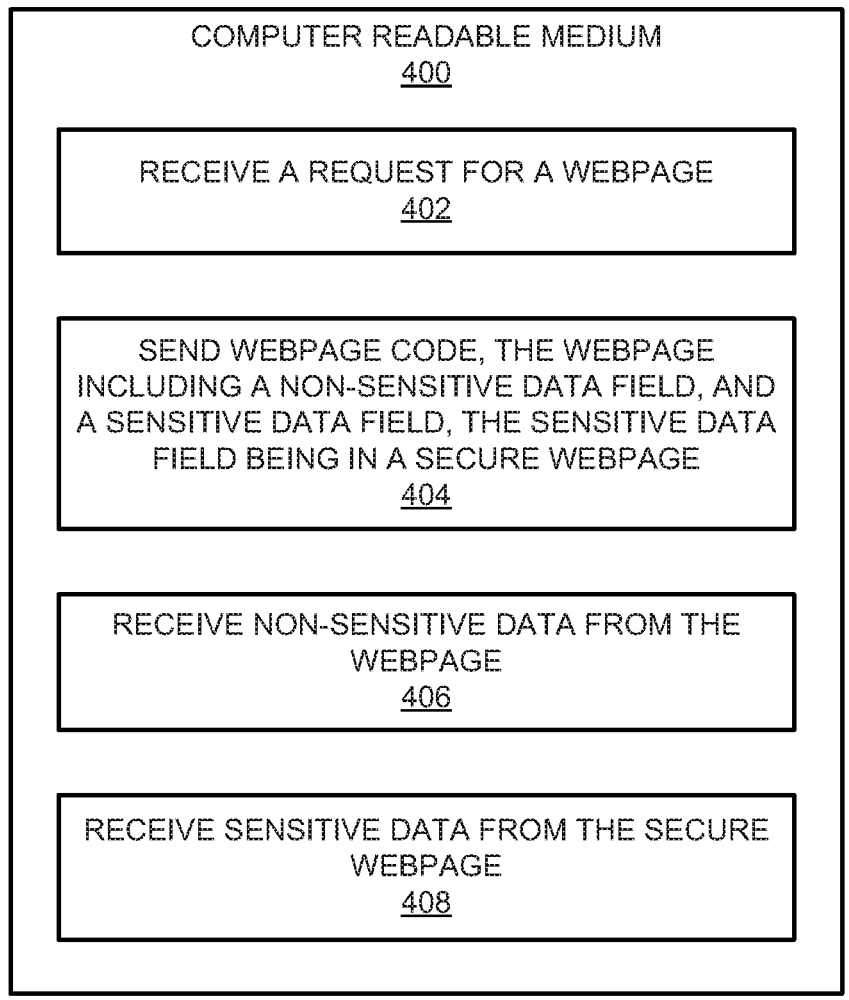
FIG. 4 depicts a block diagram of a computer readable medium that may have stored thereon machine readable instructions that when executed by a processor, may cause the processor to securely receive sensitive data entered into a secure webpage in accordance with an embodiment of the present disclosure.

Turning now to FIG. 4, there is shown a block diagram of a computer readable medium 400 that may have stored thereon machine readable instructions that when executed by a processor, may cause the processor to securely receive sensitive data entered into a secure webpage 128 in accordance with an embodiment of the present disclosure. It should be understood that the computer readable medium 400 depicted in FIG. 4 may include additional instructions and that some of the instructions described herein may be removed and/or modified without departing from the scope of the computer readable medium 400 disclosed herein. The computer readable medium 400 may be a non-transitory computer readable medium. The term "non-transitory" does not encompass transitory propagating signals.

The computer readable medium 400 may have stored thereon machine readable instructions 402-408 that a processor, such as the processor 104 depicted in FIGS. 1 and 2, may execute. The computer readable medium 400 may be an electronic, magnetic, optical, or other physical storage device that contains or stores executable instructions. The computer readable medium 400 may be, for example, Random Access memory (RAM), an Electrically Erasable Programmable Read-Only Memory (EEPROM), a storage device, an optical disc, and the like.

The processor may fetch, decode, and execute the instructions 402 to receive a request for a webpage 128 from a requester, e.g., the web browser 120 executing on the client device 118. The processor may fetch, decode, and execute the instructions 404 to send webpage code 110 of the webpage 128 to the requester. The requester may load the webpage code 110 to display the webpage 128, in which the webpage 128 may load a script to display a non-sensitive data field 130 into which non-sensitive data 112 may be entered. The webpage 128 may also load a script that initiates a request for the secure server 140 to return secure webpage code 142 for a secure webpage 132 including a sensitive data field 134, in which the secure webpage 132 is to be included in an iFrame of the webpage 128. The iFrame may include an identifier that points to the secure server 140. Sensitive data 114 entered into the sensitive data field 134 may be protected from scripts loaded in the webpage 128 to secure the sensitive data 114 from the scripts. The secure server 140 may receive the sensitive data 114 entered into the sensitive data field 134 in response to a user action, after a predetermined time period, and/or in response to another action.

The processor may fetch, decode, and execute the instructions 406 to receive the non-sensitive data 112 entered into the non-sensitive data field 130 from the webpage 128. In addition, the processor may fetch, decode, and execute the instructions 408 to receive the sensitive data 114 from the secure server 140. The processor may receive the sensitive data 114 through communication of a handle with the secure server 140 as discussed herein. Additionally, the processor may process the non-sensitive data 112 and the sensitive data 114 to perform an action with respect to the data 112, 114.

Figure 5:
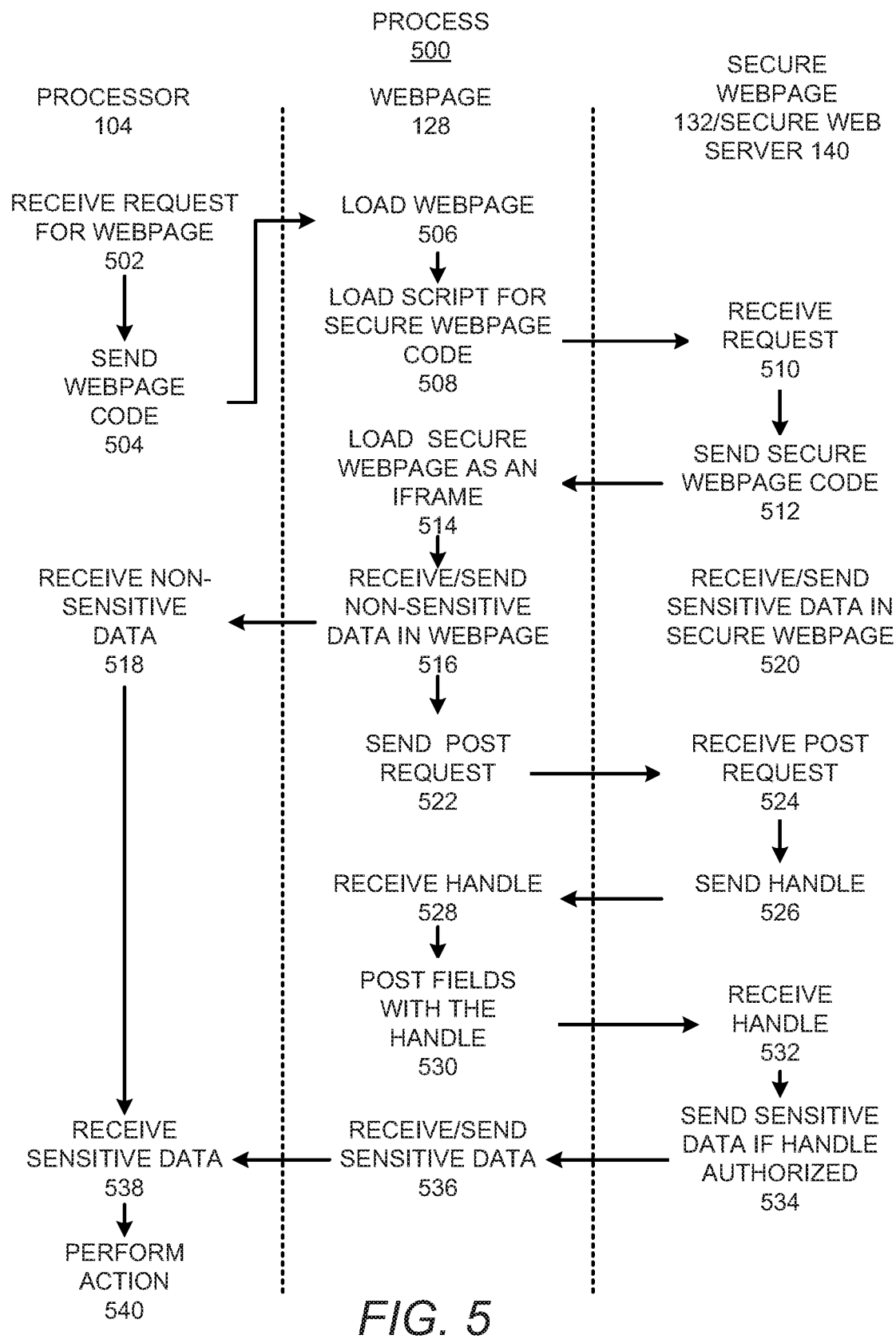
FIG. 5 depicts a flowchart of a process in which sensitive data entered into a secure webpage may be retrieved in accordance with an embodiment of the present disclosure.

Turning now to FIG. 5, there is shown a flowchart of a process 500 in which sensitive data entered into a secure webpage 132 may be securely retrieved in accordance with an embodiment of the present disclosure. It should be understood that the process 500 depicted in FIG. 5 may include additional operations and that some of the operations described herein may be removed and/or modified without departing from the scope of the process 500 disclosed herein. The description of the process 500 is made with respect to the elements shown in FIGS. 1 and 2 for purposes of illustration.

As shown in FIG. 5, the process 500 may include operations that may be performed by a processor 104, a webpage 128, and a secure webpage 132. Initially, the processor 104 may receive 502 a request for the webpage 128, e.g., a web browser 120 may initiate a https GET request to the URL of the webpage 128. The processor 104 may send 504 a webpage code 110 of the webpage 128 to the web browser 120 and the web browser 120 may load 506 the webpage 128, which may include downloading scripts referenced in the webpage 128. The webpage 128 may load 508 a script that initiates a request for the secure server 140 to return a secure webpage code 142 for the secure webpage 132 including a sensitive data field 134 to be embedded in the webpage 128. The secure webpage 132 may receive 510 the request for the secure webpage code 142 and may send 512 the secure webpage code to the webpage 128. The webpage 128 may load 514 the secure webpage 132 as an iFrame in the webpage 128.

The webpage 128 may receive 516 non-sensitive data 112 entered into a non-sensitive data field 130 of the webpage 128 and may send the non-sensitive data 112 to the processor 104. The processor 104 may receive 518 the non-sensitive data 112 and may store the non-sensitive data. In addition, the secure webpage 132 may receive 520 sensitive data 114 entered into a sensitive data field 134. The secure webpage 132 may also send the sensitive data 114 to the secure server 140.

The webpage 128 may send 522 an instruction to the secure webpage 132 to post the sensitive data 114. The secure webpage 132 may receive 524 the instruction to post the sensitive data 114 and may send 526 a handle to the webpage 128, in which the handle may represent the sensitive data 114. The processor 104 may receive 528 the handle and may post 530 fields in its UI to the webpage 128 with the handle. The secure server 140 may receive 532 the handle and upon verification of the handle, may send 534 the sensitive data 114 to the processor 104. The processor 104 may receive 538 the sensitive data 114 and may perform 540 an action with respect to the non-sensitive data 112 and the sensitive data 114, e.g., approve or deny a transaction requested by a user 124.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus for a webpage host server comprising:
   a processor; and
   a non-transitory computer readable medium storing machine readable instructions that, when executed by the processor, cause the processor to:
   receive a request for a first webpage from a client device;
   send the first webpage including first webpage code to the client device, wherein the first webpage code includes an instruction for the client device to load a script that initiates a secure-webpage request that is sent to a secure server, wherein, in response to receipt of the secure-webpage request from the client device, the secure server generates a secure webpage code and returns the secure webpage code corresponding to a secure webpage to the client device, wherein execution of the secure webpage code on the client device causes the secure webpage to be embedded in the first webpage on the client device, wherein the secure webpage includes a sensitive data field to receive sensitive data from a user, and wherein, in response to receiving the sensitive data in the sensitive data field included in the secure webpage, the secure webpage on the client device sends the sensitive data to the secure server, assigns a handle corresponding to the sensitive data, and sends the handle to the first webpage on the client device and to the webpage host server;
   receive, at the webpage host server, the handle corresponding to the sensitive data and an operational status indicating whether the secure server successfully collected the sensitive data; and
   based on the operational status of the sensitive data, send the handle corresponding to the sensitive data from the webpage host server to the secure server to receive the sensitive data from the secure server.

2. The apparatus of claim 1, wherein the first webpage includes a non-sensitive data field and wherein non-sensitive data is received into non-sensitive data field, and wherein the instructions further cause the processor to:
   collect the non-sensitive data from the non-sensitive data field.

3. The apparatus of claim 1, wherein the instructions further cause the processor to:
   use the received sensitive data to perform an action.

4. The apparatus of claim 1, wherein the handle comprises a token or a session identifier associated with the sensitive data.

5. The apparatus of claim 1, wherein the instructions further cause the processor to:
communicate an instruction to the secure webpage to post the sensitive data.

6. The apparatus of claim 1, wherein the secure webpage is included in an inline frame embedded in the first webpage.

7. The apparatus of claim 1, wherein the first webpage code loads the script from a script library and wherein the script is prevented from accessing the sensitive data entered into the sensitive data field.

8. The apparatus of claim 1, wherein the sensitive data comprises at least one of a credit card number, a card verification value, a social security number, and a birth date.

9. A method comprising:
receiving, by a processor of a webpage host server, a request for a first webpage from a client device;
sending, by the processor of the webpage host server, the first webpage including first webpage code to the client device, wherein the first webpage code includes an instruction for the client device to load a script that initiates a secure-webpage request that is sent to a secure server, wherein, in response to receipt of the secure-webpage request from the client device, the secure server generates a secure webpage code and returns the secure webpage code corresponding to a secure webpage to the client device, wherein execution of the secure webpage code causes the secure webpage to be embedded in the first webpage on the client device, wherein the secure webpage includes a sensitive data field to receive sensitive data from a user, and wherein the secure webpage receives the sensitive data entered into the sensitive data field, sends the sensitive data to the secure server, assigns a handle corresponding to the sensitive data and sends the handle to the first webpage on the client device and to the webpage host server;
receiving, by the processor of the webpage host server, the handle corresponding to the sensitive data and an operational status indicating whether the secure server successfully collected the sensitive data;
based on the operational status of the sensitive data, sending, by the processor of the webpage host server, the handle to the secure server; and
receiving, by the webpage host server, the sensitive data from the secure server.

10. The method of claim 9, wherein the first webpage includes a non-sensitive data field and wherein the method further comprises:
receiving non-sensitive data entered into the non-sensitive data field; and
using the received sensitive data and the received non-sensitive data to perform an action requested through the first webpage.

11. The method of claim 9, further comprising:
communicating an instruction to the secure webpage to post the sensitive data.

12. The method of claim 9, wherein the secure webpage is included as an inline frame in the first webpage.

13. The method of claim 9, wherein the secure server receives the sensitive data without the client device sending the sensitive data to the processor of the webpage host server.

14. The method of claim 9, further comprising:
downloading another script from a script library.

15. A non-transitory computer readable medium storing machine readable instructions that when executed by a processor, cause the processor to:
receive, at a webpage host server, a request for a first webpage from a client device;
send the first webpage including first webpage code to the client device, wherein the client device is to load the first webpage code to display the first webpage, wherein the first webpage code includes an instruction for the client device to load a script that initiates a secure-webpage request that is to be sent to a secure server, wherein, in response to receipt of the secure-webpage request, the secure server generates a secure webpage code and returns the secure webpage code corresponding to a secure webpage to the client device, wherein execution of the secure webpage code on the client device causes the secure webpage to be embedded in the first webpage, wherein the secure webpage includes a sensitive data field to receive sensitive data from a user, and wherein the secure webpage receives the sensitive data entered into the sensitive data field, sends the sensitive data to the secure server, assigns a handle corresponding to the sensitive data and sends the handle to the first webpage on the client device and to the webpage host server;
receive, at the webpage host server, the handle corresponding to the sensitive data and an operational status indicating whether the secure server successfully collected the sensitive data; and
based on the operational status of the sensitive data, send the handle corresponding to the sensitive data from the webpage host server to the secure server to receive the sensitive data from the secure server.

16. The non-transitory computer readable medium of claim 15, wherein the instructions further cause the processor to:
communicate an instruction to the secure webpage to post the sensitive data.

17. The non-transitory computer readable medium of claim 15, wherein the secure webpage is included in an inline frame (iFrame) included in the first webpage.

18. The non-transitory computer readable medium of claim 15, wherein the first webpage is to load the script from a script library.

* * * * *